Oct. 17, 1950 — J. G. DE REMER — 2,525,781
BALANCING OF ROTATABLE BODIES
Filed Sept. 15, 1944 — 3 Sheets-Sheet 1
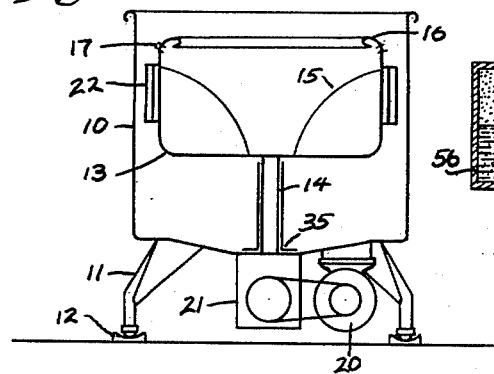
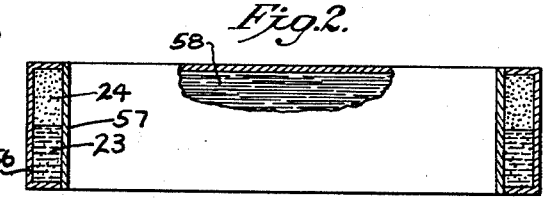
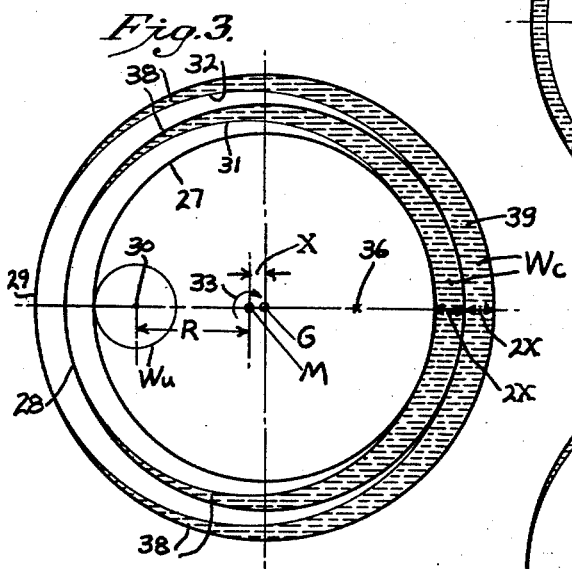
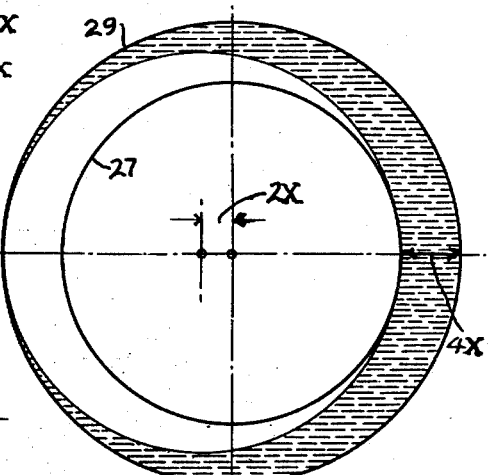
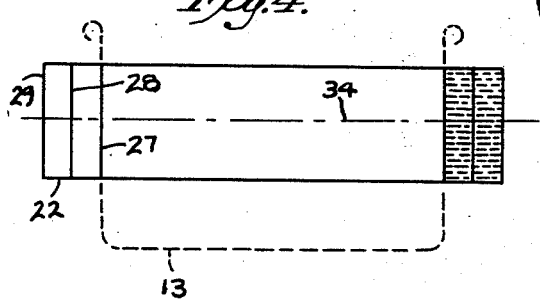
INVENTOR
JAY GRANT DE REMER
BY Albert M. Austin
ATTORNEY Oct. 17, 1950    J. G. DE REMER    2,525,781
BALANCING OF ROTATABLE BODIES
Filed Sept. 15, 1944    3 Sheets-Sheet 2
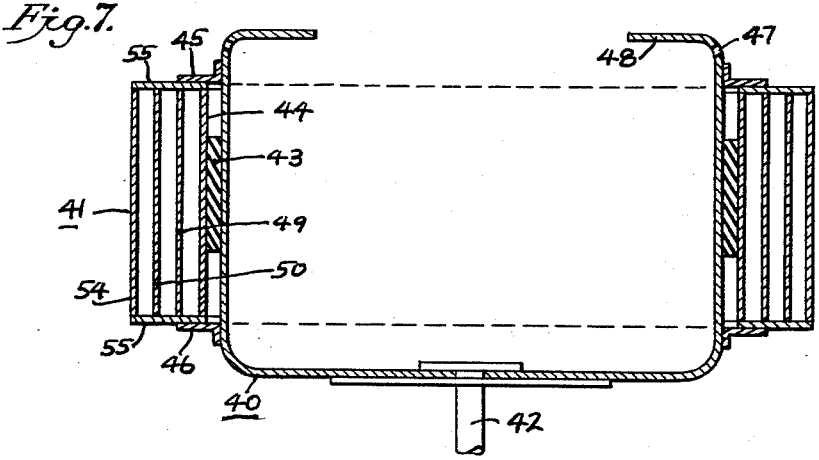
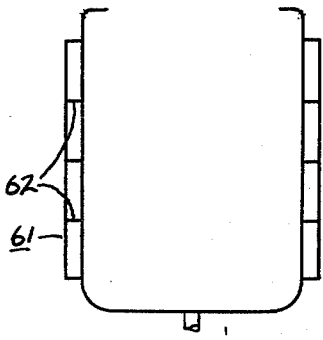
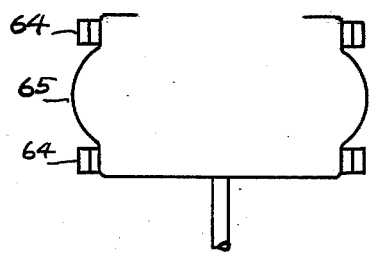
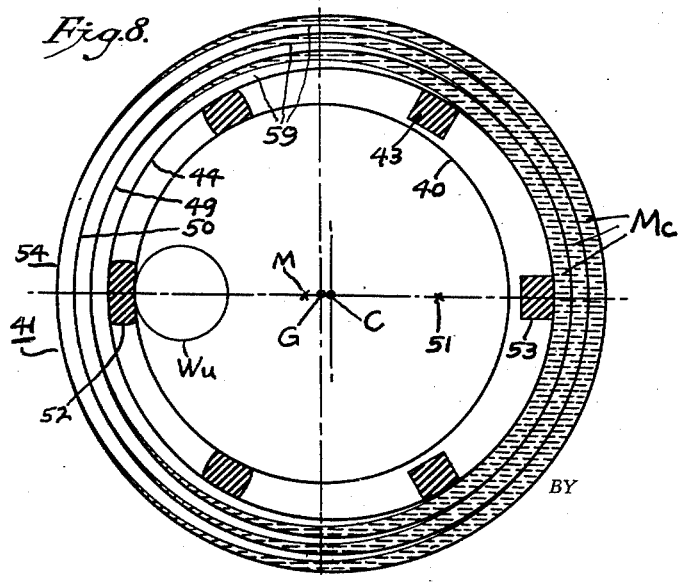
INVENTOR
JAY GRANT DE REMER
Albert M. Austin
ATTORNEY Oct. 17, 1950  J. G. DE REMER  2,525,781
BALANCING OF ROTATABLE BODIES
Filed Sept. 15, 1944  3 Sheets-Sheet 3
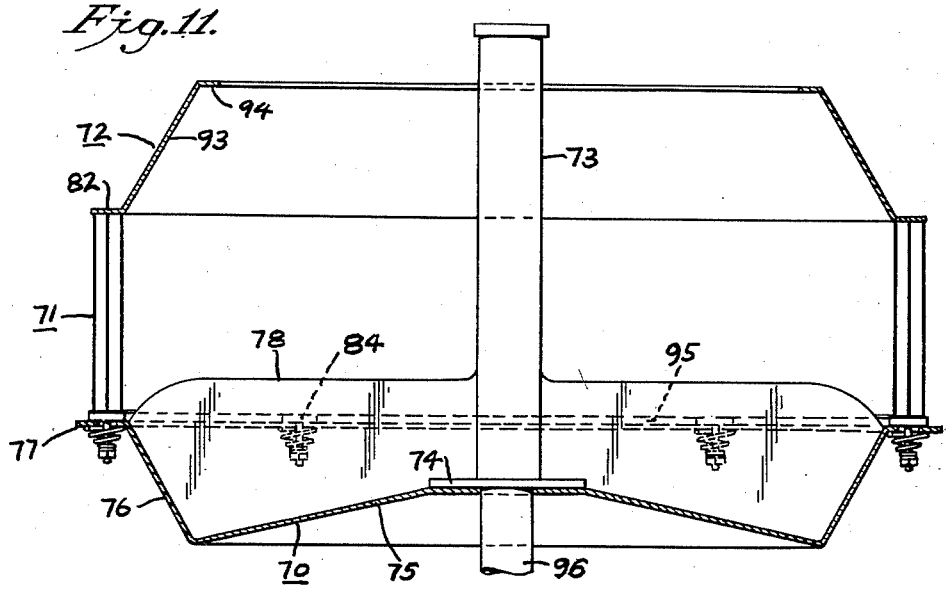
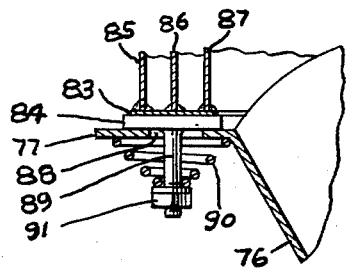
INVENTOR
JAY GRANT DE REMER
BY
Albert M. Austin
ATTORNEY Patented Oct. 17, 1950

2,525,781

UNITED STATES PATENT OFFICE 2,525,781

BALANCING OF ROTATABLE BODIES

Jay Grant De Remer, Darien, Conn., assignor to J. G. De Remer Research Corporation, Union City, N. J., a corporation of New Jersey Application September 15, 1944, Serial No. 554,327

6 Claims. (Cl. 210—63)

1

The invention relates generally to the balancing of rotatable bodies and more particularly to the balancing of centrifugal driers, such as those used in houshold washing machines.

The difficulties in balancing the baskets of centrifugal extractors are caused primarily by the load being out of balance; that is to say, the center of mass of the rotating body does not coincide with the geometrical axis of rotation. The machine therefore tends to rotate about its center of mass, generating a couple which tends to gyrate the entire machine about the said center of mass and causes the well known vibration.

In general, two main methods have heretofore been proposed to overcome this serious problem. One method is to balance the basket itself in such way as to overcome or minimize the effect of the unbalanced load. The second method is to accept the unbalanced condition of the basket and so construct the machine so as to permit the basket to rotate about its center of mass with a minimum of disturbance.

An example of the first general method of overcoming vibration heretofore proposed is the use of a heavy basket or heavy balance rings to provide a flywheel effect so that any unbalance due to uneven distribution of the clothes will be small compared to the mass of the balanced flywheel. Other examples involve movable balancing devices including various liquid arrangements wherein the liquid shifts under centrifugal force to correct the unbalance.

One example of the second general method of overcoming unbalance heretofore used, is the use of a flexible mounting between the rotating basket and the frame of the machine whereby the basket can rotate about its own center of mass without disturbing the rest of the machine. Another example is to permit the entire machine to dance or gyrate around on the floor, flexible legs or caster cups being provided to limit the amount of dancing or gyration.

The present invention constitutes an improvement over the first of the two general methods above mentioned. According to a preferred embodiment of the present invention, one or more hollow rings partially filled with liquid are placed around the basket. The ring may contain any desirable liquid but it is preferred to use a liquid having a higher density than water, such as a saturated solution of potassium carbonate. It is preferred that height (axial dimension) of the ring be at least several times its thickness (radial dimension) for most efficient balancing action. Suitable baffling, such as steel wool, is provided

2 to prevent the liquid from sloshing around the ring. It is preferred to use a plurality of such liquid containing rings or ducts in nested relation since it has been found that a limited amount of liquid in any one ring gives most effective balancing action and that a plurality of nested separate rings containing limited amounts of liquid gives more effective balancing action than the same amount of liquid in a single ring of the same thickness as the combined thickness of the separate rings. If desired, instead of fixedly mounting these one or more rings on the basket, spring devices, such as rubber pads, may be interposed between the rings and basket. These pads permit the rings to shift under the action of centrifugal forces with respect to the basket in such manner as to further reduce the vibration due to out of balance.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which:

Fig. 1 illustrates diagrammatically a conventional household washing machine with one form of the invention applied thereto;

Fig. 2 illustrates the construction of one form of balance ring according to the invention;

Fig. 3 is a diagrammatic view illustrating the action of two balance rings applied to a washing machine basket according to the invention;

Fig. 4 is a diagrammatic elevation of the construction shown in Fig. 3;

Figs. 5 and 6 are diagrammatic views illustrating the action of a balance ring of twice the thickness of each section of the balance ring illustrated in Fig. 3;

Fig. 7 illustrates diagrammatically a basket equipped with a three section balancing ring with spring pads between the ring and the basket to permit the ring to shift with respect to the basket;

Fig. 8 is a diagrammatic plan view of Fig. 7 illustrating the action of the rings when the basket is rotating;

Figs. 9 and 10 illustrate diagrammatically other types of basket with other arrangements of balancing rings;

Fig. 11 illustrates another arrangement of basket with shiftable balance ring; and Fig. 12 is a detail of Fig. 11 illustrating the shiftable connection between balance ring and basket plate.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspects of the invention.

Referring now to the drawings, Fig. 1 illustrates diagrammatically one form of household washing machine with the invention applied thereto. The invention may be applied to any type of rotating mass regardless of the direction of the axis of rotation, including other types of laundry machines, as explained more in detail hereinafter. The washing machine shown is of a conventional type comprising a tank 10 supported on legs 11 which have casters resting in concave caster cups 12 resting on the floor.

Within the tank 10 is the clothes basket 13 rotatably mounted on a suitable pedestal 14 supported by the bottom of tank 10. The basket 13 may be of the imperforate type holding water for washing and may be provided with agitator blades 15 fixedly mounted in the basket for washing. The basket may have a suitable clothes retaining ring 16 with discharge openings 17 at the upper edge of the side wall.

For driving the machine, an electric motor 20 may be suspended from the tank bottom, driving suitable gearing in a gear box 21. The gear box gearing drives the basket 13 through suitable shafting within the pedestal 14.

Arrangement is made for oscillating the basket 13 about its own axis to wash the clothes, the baffles 15 assisting in tumbling the clothes for the washing operation. Provision is also made for continuously rotating the basket about the axis of pedestal 14 for centrifugally extracting the water from the clothes.

For balancing the basket 13 a plurality of hollow rings 22 may be rigidly attached to the side wall of the basket. These rings may be suitably contructed of sheet material. Each ring may be filled approximately one-half full of balancing liquid 23, as indicated in Fig. 2, and the entire ring may be packed with suitable baffling material indicated by 24. The construction of the ring and its method of operation will be discussed more in detail hereinafter.

The liquid balancing rings play no part in the washing action. If desired, instead of oscillating the basket 13 for washing, the basket may be held stationary and a separate agitator (not shown) may be oscillated back and forth either vertically or about the axis of pedestal 14. The liquid balancing rings 22 assist materially in balancing the basket 13 when it is rotated at centrifugal drying speed for expelling the water from the clothes or other material in the basket.

The following explains the action of the liquid balancing rings of Fig. 1. It will be understood, however, that this explanation is given to assist in understanding the invention and not in any limiting sense. The explanation is based on understanding of the invention at the present time, but regardless of theory, it has been found by practical experiment that, by practicing the invention as described herein, the balancing of a clothes basket in a household washing machine can be materially improved.

Referring now to Figs. 3 and 4, the circular wall of the basket is denoted by 27 and its geometric axis or center of rotation with balanced load is denoted by G. The cylindrical walls of the two rings 22 are denoted by 27, 28 and 29 concentric with G. The unbalanced mass (due for example, to uneven distribution of the clothes) is denoted by $Wu$ and is assumed to be concentrated at point 30 offset from the center of mass M by radius R.

The effect of the off-center unbalanced mass $Wu$ is to cause the true center of mass of the entire rotating body, including the basket and its contents, to shift from G to a point M through a distance X. The basket will then rotate, when driven at centrifugal discharging speed, about the center of mass M and the liquid in the rings 22 will take position with the inner surfaces of the liquid concentric with M as indicated by 31, 32.

For most efficient balancing action according to the invention, the ring thickness is made 2X where X is the maximum allowable amplitude of vibration for which the machine is designed. Maximum vibration will occur when the machine is unevenly loaded with the maximum out-of-balance load for which the machine is designed. The value X is most conveniently measured in actual practice by measuring the diameter of the circle the geometrical center G describes about the center of mass M; this diameter will be referred to as the double amplitude of vibration which is 2X. This rotation of G about M is denoted by the arrow 33.

It will be understood that the point 30 at which the unbalanced mass is considered to be concentrated and the radii R and X are assumed to be in a plane 34 perpendicular to the true axis of rotation, shown in Fig. 4. When measured at the top of the basket the amplitude of vibration X may be somewhat larger than at plane 34 if the pedestal 14 is flexibly mounted at 35 in Fig. 1. If the pedestal is not flexibly mounted and the whole machine dances about M as a center in cups 12, the double amplitude of vibration measured at the top of the basket will be the same as that measured at plane 34.

When the basket 13 is at rest and its axis vertical, the ring liquid will of course be evenly distributed. When the basket rotates about its true geometrical axis G, assuming the load and rotating parts to be symmetrical about this axis, the liquid will also be evenly distributed within the rings.

If, however, the rotating mass, which includes the basket and its contents, is unbalanced, which will be the usual condition in use, the basket will rotate about some point other than G, which is called the center of mass M as described above. Since the liquid tends to take a position furthest away from the center of rotation, the liquid will flow to a point remote from the unbalanced mass $Wu$ as indicated in Fig. 3, tending to correct the unbalanced condition and to bring the resultant center of mass M closer to the geometrical axis G than if the balancing rings were not used.

The most efficient correcting action takes place with the greatest relative shift of liquid. This condition obtains when the surfaces 31, 32 of the liquid are tangent to their inner and outer ring walls as indicated in Fig. 3, the liquid taking a crescent shape with its horns 38, on the opposite side of the center of mass M from the main body 39 of the liquid. The center of mass of the liquid crescents Wc will be at some point 36 diametrically opposite 30.

It is therefore important to obtain the most effective distribution of liquid for any condition of unbalance. This condition will be obtained with the ring about half filled with liquid and when the double amplitude of vibration (2X) is equal to the radial thickness of a ring. As will be seen from the drawing, the inner surface of the liquid, ignoring gravity, always takes a shape concentric about the actual center of rotation (center of mass).

Figs. 5 and 6 help explain the increase in efficiency of liquid balancing action due to deliberate limitation of ring thickness and use of a plurality of rings or sections to obtain the necessary amount of liquid mass. These figures show the effect of a single ring or section with the same interior volume and same amount of liquid as contained in the two rings of Fig. 3 combined. The inner wall of the ring is denoted by 27 and the outer wall by 29, the ring being double the thickness of each ring of Fig. 3 but the same height.

This explanation ignores, for simplicity, the effect of wall thickness and the fact that the liquid capacity of the larger ring is slightly larger than that of the smaller ring of the same thickness. This approximation is reasonably close to real conditions because the walls may be of relatively thin sheet metal and the relative difference in the diameters of the inner and outer concentric rings is comparatively small.

Assuming then in Fig. 5 an axis shift of X and a ring thickness of 4X, a much less unbalanced load can be handled with the same amount of balance liquid with the same amplitude of vibration since the liquid inside of dotted line 62 is of no avail for balancing in this particular condition. This is explained because its center of mass is at M and consequently exerts no counterbalancing action on unbalanced mass Wu, whereas the liquid crescent between wall 29 and dotted line 62 has a center of mass on the opposite side of the main center of mass M from Wu.

Fig. 6 shows that the center of mass M must shift 2X from the geometric center G to obtain optimum liquid distribution for the single ring and yet the weight of the liquid crescent is substantially no greater than in Fig. 3 where only one half the axis shift X is necessary to bring about optimum liquid distribution for the same out of balance mass Wu.

The above comparison is not exactly correct since the correcting couple depends not alone on the value of correcting mass but upon the radius through which the mass acts but it is sufficiently correct to help explain the correction action, and is borne out in actual test.

It will thus be seen that any ring of liquid concentric with the center of mass (which is the center of rotation) performs no correcting action because all of the diametrically opposed parts of such liquid ring are in balance and there is no extra part available to correct the unbalance due to unbalanced load. It is naturally desirable to have the most efficient correcting action occur at as small an amplitude of vibration as possible.

It therefore follows that for an efficient correcting action at small vibration amplitude the ring should be comparatively thin.

On the other hand, for overcoming a large unbalanced mass, a large mass of counter-balancing liquid is required. One manner of obtaining the correcting action of a large amount of liquid is to use a thicker ring holding more liquid, but as above pointed out, the use of a thicker ring does not provide effective correcting action at small vibration amplitudes.

According to the invention the problem is solved by providing a plurality of separate thin rings. These rings may be either concentrically arranged, one within the other as in Fig. 1, for example, or they might be superimposed one above the other as in Fig. 9, for example. The former relationship is particularly useful for comparatively shallow baskets while the latter relationship might be used more conveniently for comparatively tall baskets. In the latter case, the partitions between the rings become unnecessary and in place of a series of thin rings placed one above the other, a single tall, thin ring may be used.

The operation of the invention may be better understood from a consideration of the following equation in connection with Figs. 3, 5 and 6 of the drawings:

$$W_u R = X(NW_s + W_r + W_b)$$

Where:

$W_u$ equals the amount of unbalanced load which will be assumed to be concentrated at the point 30.

R equals the distance from the center of mass M to the point 30.

X equals the axial shift between the geometrical center of the basket, G, and the center of mass M.

(2X equals the double amplitude of vibration which equals the ring thickness.)

N equals the number of liquid balance rings used.

$W_s$ equals the weight of a solid cylinder of balancing liquid of the same diameter as the basket and of the same height as a balance ring.

$W_r$ equals the weight of all of the rings without liquid.

$W_b$ equals the weight of the empty basket without the rings.

For a small household laundry machine, $W_r$ and $W_b$ may each be about twenty pounds, and $W_s$ may be about one hundred and ten pounds. Therefore, the two values $W_r$ and $W_b$ may be ignored to get an approximate equation which will give a simple approximate relationship of the several quantities. The new equation is as follows:

$$W_u R = XNW_s$$

It will thus be seen from the above simplified and approximate equation that, for any given unbalanced condition, the correcting force depends upon the product of the (a) shift between geometrical center and center of mass, (b) the weight $W_s$ (which is a fixed quantity for any given basket) and (c) the number of rings. It therefore follows that the greater the number of rings, the less the axial shift, and hence the less the amplitude of vibration. Or, in other words, for any given shift in the axis of rotation, the greater the number of balance rings that are used, the greater the unbalance that can be handled.

It therefore follows that the amplitude of vibration resulting from a given unbalanced mass located in the rotor at a given radius from the actual rotation axis is susceptible of exact calculation and may be made as small as desired, although practical aspects limit the reduction of this amplitude to certain definite finite values. Theoretically this amplitude of vibration can never be eliminated entirely with liquid balance rings fixedly mounted on the basket but it can be greatly reduced, almost in direct proportion to the number of rings used.

Although theoretically the basket can never be exactly balanced by the use of fixedly mounted balance rings, it is possible exactly to balance the basket by movably mounting the liquid balancing rings so that the center of mass of the entire rotating body may be made actually to coincide with the geometrical center of rotation. The construction for achieving this result is illustrated diagrammatically in Figs. 7 and 8.

Here the basket is indicated by 40 and the three shiftable balance rings are indicated by 41. The drive shaft on the geometrical axis of the basket is indicated by 42. The balance rings, which may be rigidly secured to each other, have a plurality of resilient blocks 43, such as rubber, cemented or bonded to the inner surface of the inner ring wall 44.

The several rings 41 may be filled with baffling and half filled with liquid the same as the single ring illustrated in Fig. 2. The rings 41 are constrained to radial movement by flanges 45, 46 secured to the basket 40. The basket may be of the imperforate type holding water for washing and having discharge openings 47 and clothes retaining ring 48.

The operation of this construction is as follows:

When the machine is at rest, the rings 41 are concentric with the basket 40 and the liquid is uniformly distributed around its rings. As the machine accelerates to centrifugally discharging speed, before the rings shift the liquid will distribute to the crescent shape as indicated in Fig. 3. The center of mass of these liquid crescents Mc will be at some point indicated by 51, causing the center of mass M to shift toward the geometrical center G. The centrifugal force exerted by the liquid balancing rings will compress the rubber blocks 43 on the side opposite the liquid crescents as indicated particularly at 52 in Fig. 8 while the blocks indicated by 53 will leave the surface of the basket. This means that the center of mass Mc of the liquid crescents will shift to the right in Fig. 8 and the center of the balance rings will shift away from the geometrical center G to some point C so that the center of mass of the entire rotating assembly actually coincides with the geometrical center G, thereby giving perfect correction for vibration. The surfaces 59 of the crescents are defined with G as a center in Fig. 8 since M has been shifted to G and the basket is rotating about G as a center.

Referring now again to Fig. 2 for a description of a single ring per se, the ring may be made of suitable sheet metal forming a hollow duct as indicated. The ring may comprise an outer trough-shaped member 56 suitably welded to a sheet cylinder 57. The ring may be fabricated in other ways. In the multiple section ring of Fig. 7, the ring 41 is made up of a plurality of concentric cylinders or flat bands 44, 49, 50, 54 welded between flat ring disks 55.

For preventing sloshing around of the liquid, it is important to have efficient baffling devices. A labyrinth of blade baffles may be provided, the baffles extending both axially and circumferentially of the ring, but it is preferred to use a packing 24 (Fig. 2) such as steel wool tightly packed into the ring with the fibers running circumferentially of the ring as indicated at 58. Other material such as rock wool, fiber glass, sponge rubber, may also be used. It has been found that material such as steel wool, even when packed tightly in the ring and completely filling the ring, occupies only a small percentage of the volume of the ring, leaving plenty of open space for the liquid.

It is desired that the balancing liquid be of as great a density as possible for efficient balancing action. A saturated solution of potassium carbonate having a density of 1.5 has been found to act efficiently with steel wool. Other high density solutions may be made from saturated solutions of methylene iodide having a density of 3.3 or of methylene bromide having a density of 2.46. A saturated solution of calcium chloride may also be used. A combination of metallic mercury having a density of 13.6 and rock wool has also been used with marked success. It is obvious that liquids having naturally high viscosity may also be used, the baffling being appropriately changed. Such materials may be colloidal such as corn starch solutions, or thick motor oil.

It is obvious that the invention has a wide field of use. Either the fixed ring form of Fig. 1 or the shiftable ring form of Fig. 7 may be applied to present day commercial washing machines having various shaped baskets and axes of rotation. For example, it may be applied to a comparatively tall small diameter basket. Such a type of basket is illustrated diagrammatically in Fig. 9 wherein the separate rings 61 are axially arranged one on top of the other. Since the liquid acts radially, the partitions 62 between the rings in this form may be eliminated and if desired the separate rings may be replaced by a single ring of the same thickness but of the combined axial dimension of the four rings shown; in this case the axial dimension of the ring is obviously at least several times its radial dimension. This relationship of axial dimension to radial dimension also obviously applies to the individual rings of Figs. 1 and 7, and to the individual rings of Fig. 11 (hereinafter described) in which the balance rings act as the side wall of the basket; in all cases the individual rings extend axially along a substantial part of the basket wall.

The invention may also be applied to a basket of the shape illustrated in Fig. 10. This type of basket is comparatively shallow and is made for the purpose of overcoming dynamic unbalance as well as static unbalance. The rings 64 here are arranged both radially, one within the other and axially, one set above the other. The basket has a central bulge 65 for the purpose of causing the clothes to converge axially into the bulged space, thus keeping as much as possible the unbalanced load in a predetermined plane to minimize tendency of the clothes to cause dynamic unbalance.

Referring now to Figs. 11 and 12, the invention is shown applied to a centrifuge basket in another way, wherein the balance ring itself forms part of the side wall of the basket and the ring may be perfectly free to shift with respect to the geometric axis of the basket. Here the basket comprises, generally, a base 70, a multi-section balance ring 71 and a top 72. A hub 73 is journaled on a post or pedestal 96 rising up from the bottom of a tank (not shown). The hub 73 is provided with a reinforcing plate or flange 74 for securement to the base 70.

The base 70 comprises a flat cone 75 sloping outwardly and downwardly to an upwardly diverging side wall 76. A plurality of radial agitator blades 78 connect side wall 76, bottom wall 75 and hub 73 to strengthen the basket and to agitate the clothes, as will appear hereinafter.

The base 70 has a peripheral flange 77 on which slidably rests the shiftable multi-section balancing ring 71. Ring 71, as shown, is made up of two sections but the number of sections may be increased or decreased as desired. Each section is packed with baffling material and half filled with balancing liquid, as explained in connection with the rings above. The ring 71 comprises concentric cylindrical walls 85, 86, 87 suitably welded to top ring 82 and bottom ring 83.

The shiftable relationship of the balancing ring 71 and base 70 is accomplished by providing a plurality of blocks 84 rigidly secured to bottom ring 83. The blocks 84 slidably rest upon the flange platform 77 and are suitably spaced around the circumference of the basket providing a circumferential slot 95 through which the water may be expelled during drying, as explained below.

The blocks 84 may be in the form of a continuous ring if an imperforate type basket is desired. In this case appropriate holes would be placed in the wall 93 as the largest diameter to discharge liquid.

The blocks 84 have suitable spindles 89 depending therefrom and passing through holes 88 in peripheral flange 77 with suitable clearance to permit the necessary play or shifting of the liquid balancing ring. A plurality of conical compressional springs 90 seat against the underside of ring 77 and nuts 91 hold the springs 90 in position. These springs hold the liquid balancing ring in assembled relationship to the basket and tend to center it with respect to the geometric center of the basket when the basket is stationary, as explained more particularly hereinafter.

The top 72 comprises the flange 82 which forms the top ring of the balance ring assembly 71, as already explained. The top 72 also comprises a sloping annular wall 93 and an inwardly extending top flange 94.

The basket in Fig. 11 may be used in different types of washing machines but is preferably used in the portable, household washing machine of the type shown in Dunham Patent No. 2,136,787 granted November 15, 1938. The hub 73 may be mounted on the pedestal 96 and the basket driven by drive shafts within the pedestal 96 in the same manner as disclosed in said Dunham patent.

The operation of Fig. 11 will be explained in connection with the aforementioned Dunham Patent No. 2,136,787. Washing will be accomplished by filling the tank with washing liquid and the basket will be oscillated on its post 96, the blades 78 agitating the clothes and washing them.

For drying, the water will be drained from the tank, the water flowing through slot 95 out of the basket and the basket will be spun about its geometric axis, which is the axis of post 96, for centrifugal extraction operation. The conical walls 93 and 76 act to slide the clothes against the liquid balance ring 71, the water being discharged through slot 95. The sloping of the clothes toward the plane of the balance ring facilitates dynamic balancing of the machine.

The operation of the balancing action of Fig. 11 will be similar to that described in connection with Figs. 7 and 8 except that there is no substantial centering action exerted by springs 90 as compared wtih the substantial pressures exerted by rubber blocks 43. The springs 90 are preferably made only strong enough to hold the balance ring down and to permit centering of the balance ring with respect to the geometric center of the basket when the machine is stationary. This spring action is so small compared to the large centrifugal forces generated at centrifugal drying speed as to be practically negligible. However, if desired, the springs 90 may be designed to give substantial centering action.

Assuming the springs 90 to be relatively weak, the liquid balance ring 71 is substantially entirely free to shift radially when the basket is rotating at centrifugally drying speed. Due to unbalance of load in the basket, the basket will at first rotate about its center of mass which will be offset from the geometrical center. This in turn will cause the balancing liquid to assume a more or less crescent shape in the balance rings as explained in Figs. 7 and 8. The rotating mass comprising the balance rings and the unbalanced load, however, will be perfectly free to center itself about the true axis of rotation which is the geometric axis of the machine, the liquid crescents being on the opposite side of the geometric axis from the unbalanced load.

The invention may be applied to practically all rotating machinery, not only to centrifugal machines but to rotating shafts of all kinds which it is desired to keep in balance. Besides household washing machines, it may be applied to commercial clothes drying machines and to centrifugal separators such as sugar machines. The invention is not limited to rotors rotating about a vertical axis as in the various species illustrated herein, but will operate with the axis of rotation in any position, horizontal or inclined.

Thus correcting apparatus has been described which is simple in construction and efficient in operation. The liquid balancing ring is inexpensive to make and yet will exert substantial balancing action. The baffling material occupies small volume even though tightly packed in the rings and permits proper distribution of the liquid in the rings. The liquid distributes itself without surging and flows sufficiently fast to perform its correcting position quickly.

The rigidly mounted balance rings will shift the center of mass toward the geometrical center and thus reduce vibration. The shifting of the balancing liquid to its most efficient operating position occurs with the maximum out-of-balance load and at the maximum vibration amplitude for which the machine is designed. The maximum allowable out-of-balance load can be made ample so that in practice this maximum unbalance never occurs. However, if by any chance an off-center load should be placed in the basket which exceeds the amount for which the machine is designed, the correcting action of the liquid will still take place except that the machine will vibrate at a greater amplitude of vibration, substantial correcting distribution of the balancing liquid ceasing after the maximum designed amplitude of vibration is reached, the machine thereafter behaving as if the balancing liquid was frozen solid in the correcting positions.

In the other forms where rings shift with respect to the geometric axis of the basket, perfect balancing is possible because of the shift of the center of mass to coincide with the geometric axis. In the shiftable ring form, correction action will occur with all load unbalances up to the load unbalance for which the machine is designed as in the fixed ring form and, if the maximum allowable load unbalance is by any change exceeded, the only thing that can happen is that the machine will vibrate with a certain amplitude of vibration which will be less than the machine would vibrate under the same condition, without any correcting rings.

It will be understood that all of the constructions given for purposes of illustration of the invention are based upon the same law of obtaining a comparatively thin liquid ring (i. e. of small radial dimension) to make the liquid distribution effective at small vibration amplitudes and extending the effective height or axial dimension of this ring at least several times the radial dimension to increase the counter-balancing mass.

While certain novel features of the invention have been disclosed herein, and are pointed out in the annexed claims, it will be understood that various omissions, substitutions and changes may be made by those skilled in the art without departing from the spirit of the invention.

What is claimed is:

1. In a centrifuge, a basket subject to an out-of-balance mass, means to rotate said basket about its geometric axis to extract material therefrom, a balance ring comprising a plurality of annular ducts, one outside the other, each duct being adapted to be partially filled with liquid, and yieldable elastic compression means interposed between the side wall of said basket and said ring, said balancing ring shifting to the side opposite the out-of-balance mass, said liquid pulling said ring against said elastic means to cause the center of mass of the entire basket assembly substantially to coincide with the geometric axis of the basket and thus balance said out-of-balance mass.

2. In a centrifuge, a spin assembly comprising a basket and a balancing duct system, said basket being subject to different unbalanced loads depending upon the weight and the positioning of the different charges of material placed in the basket, said basket, because of the unbalanced load, being subject to tendency to spin about an actual axis of rotation spaced from the geometric axis of the basket, means to spin said basket about its geometric axis, said balancing duct system being located adjacent the material-holding portion of the basket, means for arranging the spin assembly so as to allow the duct system to take a position eccentric to the actual axis of rotation of the basket, said duct system comprising at least a single annular duct adapted to contain balancing liquid, said duct having an outer wall with inwardly extending wall portions to provide an annular passage to allow the balancing liquid to flow circumferentially of the duct and pile up on the side of the spinning assembly diametrically opposite the unbalanced load when the basket is spun at extracting speed, said duct being of comparatively small radial dimension so as to make the liquid distribution most effective at small vibration amplitude of the duct with respect to the actual axis of rotation, said duct having an axial dimension at least several times its radial dimension to provide sufficient counter-balancing mass of said balancing liquid to balance the unbalanced load at said small vibration amplitude, said duct containing baffling to retard flow of the balancing liquid in both a circumferential direction and in an axial direction.

3. In a centrifuge, a spin assembly comprising a basket and a balancing duct, said basket being subject to different unbalanced loads depending upon the weight and the position of the different charges of material placed in the basket, said basket, because of the unbalanced loads, being subject to tendency to spin about an actual axis of rotation spaced from the geometric axis of the basket, means to spin said basket about its geometric axis, said balancing duct being annular and surrounding the side wall of the basket and rotatable with the basket, said duct extending axially along the greater part of the material-holding portion of the basket, said duct being adapted to contain balancing liquid, means for arranging the spin assembly so as to allow the center of the balancing duct to take a position eccentric to the actual axis of rotation of the basket, said duct having an outer wall with inwardly extending wall portions to provide an annular passage to allow the balancing liquid to flow circumferentially of the duct and pile up on the side of the spinning assembly diametrically opposite the unbalanced load when the basket is spun at extracting speed, and baffling in said duct acting to retard flow of said balancing liquid in both a circumferential direction and in an axial direction.

4. A centrifuge according to claim 3, in which the annular duct is secured substantially fixedly to the basket wall so that the basket and duct shift, laterally as a unit, with respect to the actual axis of rotation to permit the duct to perform its balancing action.

5. In a centrifuge, a spin assembly comprising a basket and a balancing duct system, said basket being subject to different unbalanced loads depending upon the weight and the position of the different charges of material placed in the basket, said basket, because of the unbalanced loads, being subject to tendency to spin about an actual axis of rotation spaced from the geometric axis of the basket, means to spin said basket about its geometric axis, said duct system comprising a plurality of annular ducts nested radially one inside the other, said ducts each surrounding the side wall of the basket and rotatable with the basket, each said duct extending axially along a substantial part of the material-holding portion of the basket, each said duct being adapted to contain balancing liquid, means for arranging the spin assembly in such manner as to allow the center of the balancing duct system to take a position eccentric to the actual axis of rotation of the basket, each said duct having an outer wall with inwardly extending wall portions to provide an annular passage to allow the balancing liquid to flow circumferentially of the duct and pile up on the side of the spinning assembly diametrically opposite the unbalanced load when the basket is spun at extracting speed, and baffling in said ducts acting to retard flow of said balancing liquid in both a circumferential and in an axial direction.

6. In a centrifuge, a spin assembly comprising a basket and a balance ring, said basket being subject to different unbalanced loads depending upon the weight and the position of the different charges of material placed in the basket, said basket, due to the unbalanced loads, being subject to tendency to spin about an actual axis of rotation spaced from the geometric axis of the basket, means to spin said basket about its geometric axis, said balance ring surrounding the side wall of the basket and rotatable with the basket, said ring extending axially along a substantial part of the material-holding portion of the basket, yieldable elastic compression means interposed between the basket wall and said ring to allow the ring to shift with respect to the basket and take a position eccentric to the actual axis of rotation of the basket, said ring being adapted to contain balancing liquid, said ring having an outer wall with inwardly extending wall portions to provide an annular passage to allow the balancing liquid to flow circumferentially of the ring and pile up on the side of the spinning assembly diametrically opposite the unbalanced load when the basket is spun at extracting speed, and baffling in said ring acting to retard flow of said balancing liquid in both a circumferential direction and in an axial direction.

JAY GRANT DE REMER.

REFERENCES CITED

The following references are of record in the file of this patent:

UNITED STATES PATENTS

| Number | Name | Date |
| --- | --- | --- |
| 305,026 | Stillman | Sept. 9, 1884 |
| 331,450 | Rothe | Dec. 1, 1885 |
| 509,982 | Wattles | Dec. 5, 1893 |
| 1,159,052 | Leblanc | Nov. 2, 1915 |
| 1,183,745 | Ledyard | May 16, 1916 |
| 1,209,730 | Leblanc | Dec. 26, 1916 |
| 1,314,005 | Louden | Aug. 26, 1919 |
| 1,743,441 | Dunham | Jan. 14, 1930 |
| 1,909,794 | Adams | May 16, 1933 |
| 1,952,574 | Adams | Mar. 27, 1934 |
| 2,224,241 | Verdier et al. | Dec. 10, 1940 |
| 2,366,236 | Clark | Jan. 2, 1945 |

FOREIGN PATENTS

| Number | Country | Date |
| --- | --- | --- |
| 10,629 | Germany | Dec. 11, 1879 |
| 250,151 | Germany | Nov. 30, 1911 |

OTHER REFERENCES

Solubilities of Inorganic and Metal Organic Compounds, by Siedell, 3d edition, vol. 1, 1940, page 726.

Inorganic Quantitative Analysis, by Fales, page 470, 1925.